(No Model.) 7 Sheets—Sheet 1.

F. F. RAYMOND, 2d.
NAIL MAKING AND DISTRIBUTING MACHINE.

No. 413,555. Patented Oct. 22, 1889.

WITNESSES

INVENTOR (No Model.) 7 Sheets—Sheet 3.

F. F. RAYMOND, 2d.
NAIL MAKING AND DISTRIBUTING MACHINE.

No. 413,555. Patented Oct. 22, 1889.

WITNESSES
J. M. Dolan
A. F. Macdonald

INVENTOR
F. F. Raymond (No Model.)

7 Sheets—Sheet 4.

F. F. RAYMOND, 2d.
NAIL MAKING AND DISTRIBUTING MACHINE.

No. 413,555. Patented Oct. 22, 1889.

WITNESSES

INVENTOR (No Model.)　　　　　　　　　　　　　　　　7 Sheets—Sheet 5.
F. F. RAYMOND, 2d.
NAIL MAKING AND DISTRIBUTING MACHINE.
No. 413,555.　　　　　　　　　　　Patented Oct. 22, 1889.
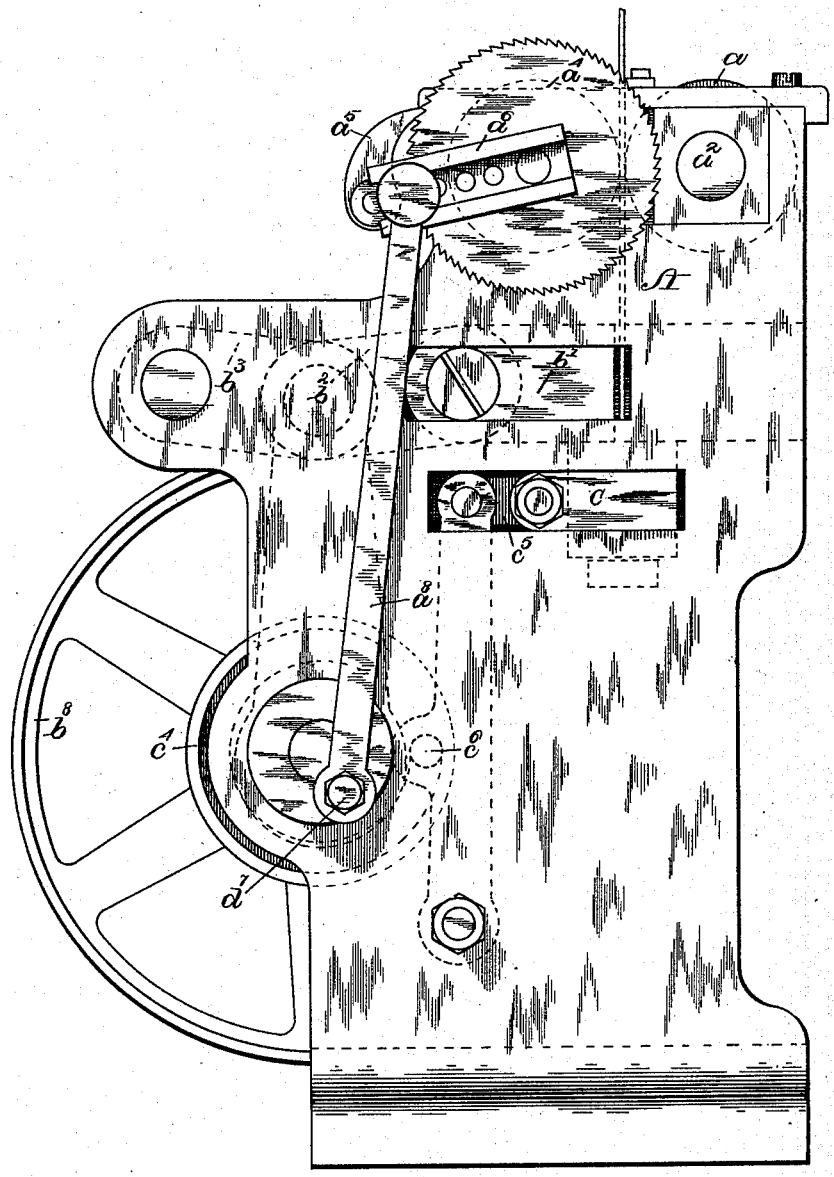
WITNESSES.　　　　　　Fig. 6.　　INVENTOR.

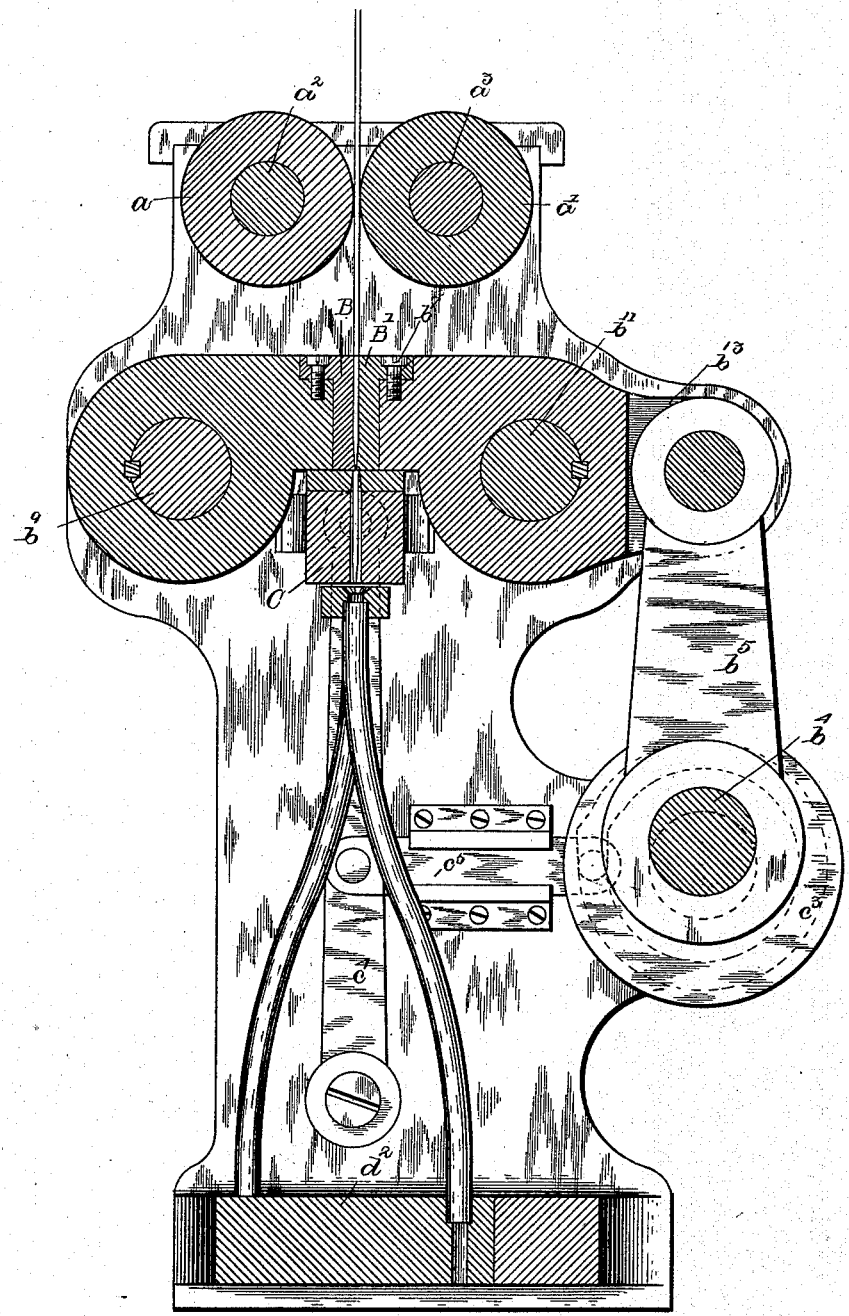

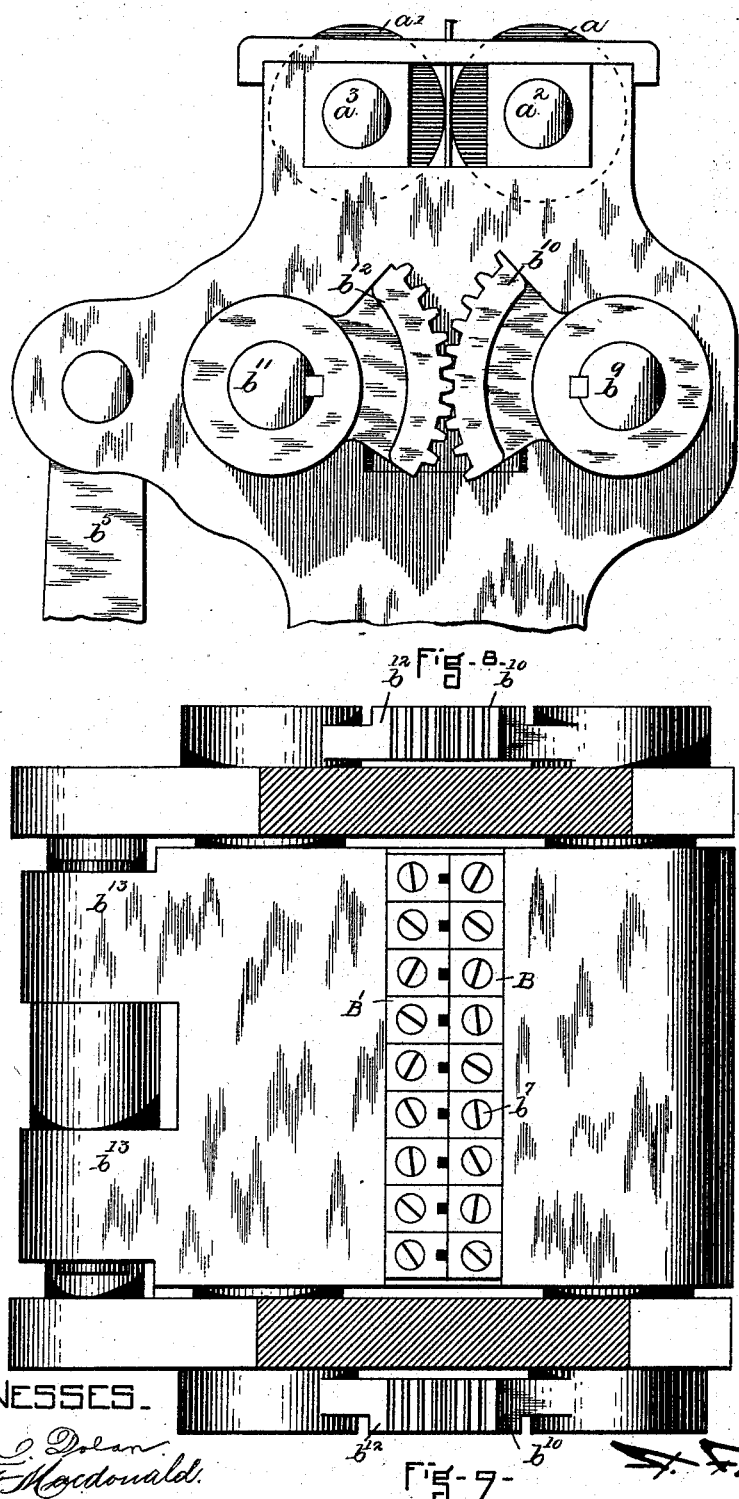

UNITED STATES PATENT OFFICE.

FREEBORN F. RAYMOND, 2D, OF NEWTON, MASSACHUSETTS.

NAIL MAKING AND DISTRIBUTING MACHINE.

SPECIFICATION forming part of Letters Patent No. 413,555, dated October 22, 1889.

Application filed February 11, 1889. Serial No. 299,518. (No model.)

*To all whom it may concern:*

Be it known that I, FREEBORN F. RAYMOND, 2d, of Newton, in the county of Middlesex and State of Massachusetts, a citizen of the United States, have invented a new and useful Improvement in Nail Making and Distributing Machines, of which the following is a full, clear, and exact description, reference being had to the accompanying drawings, forming a part of this specification, in explaining its nature.

The invention is an improvement upon that described in my Letters Patent No. 381,280, dated April 17, 1888; and it comprises, essentially, the organization, in a nail making and distributing machine, of nail-making devices comprising wire-feeding mechanism and point-swaging mechanism, a reciprocating cut-off block, a nail-distributer, and a nail-carrier.

It also relates to various details of organization and construction, all of which will hereinafter be described.

Figure 1:
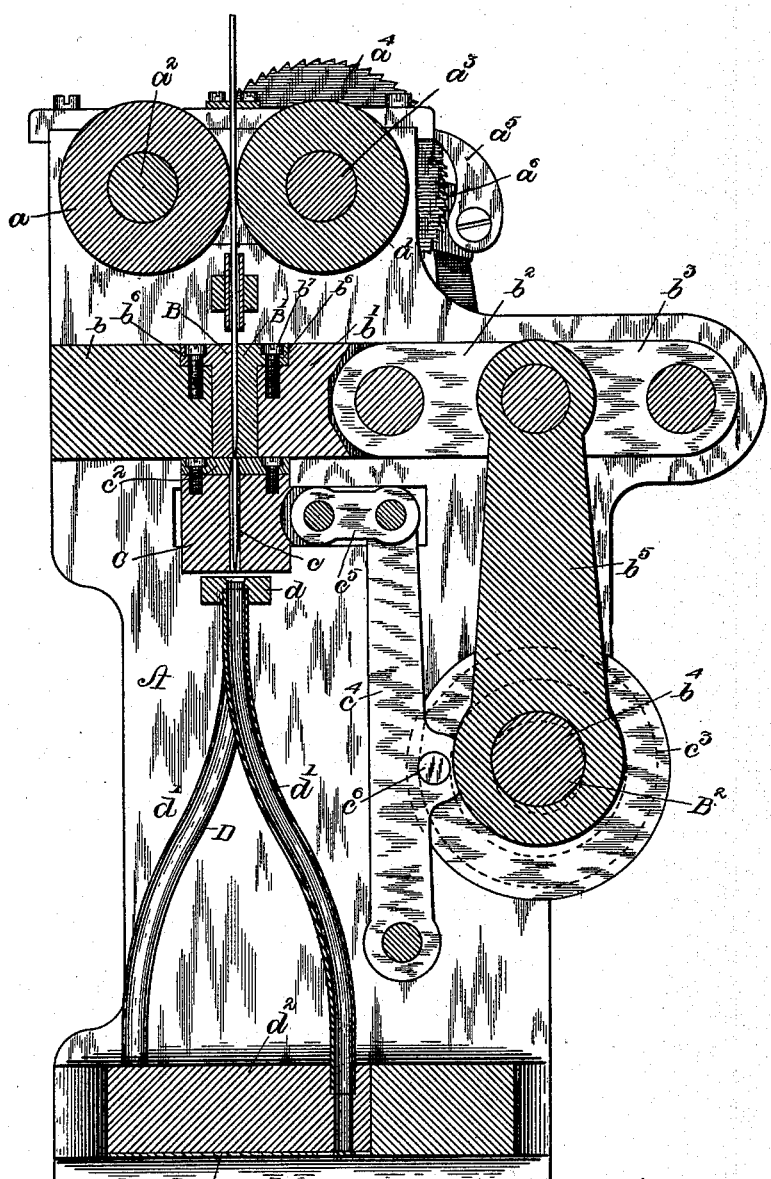
Figure 2:
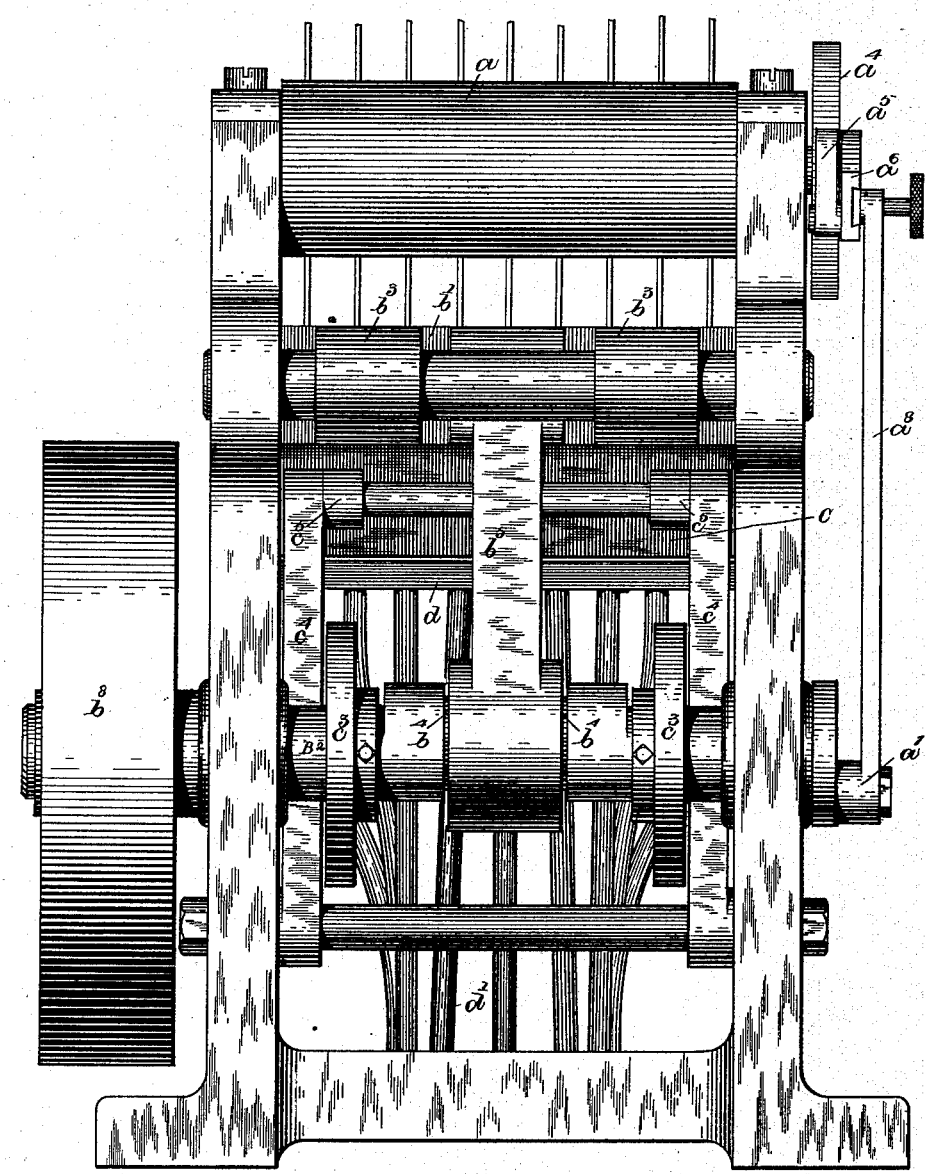
Figure 3:
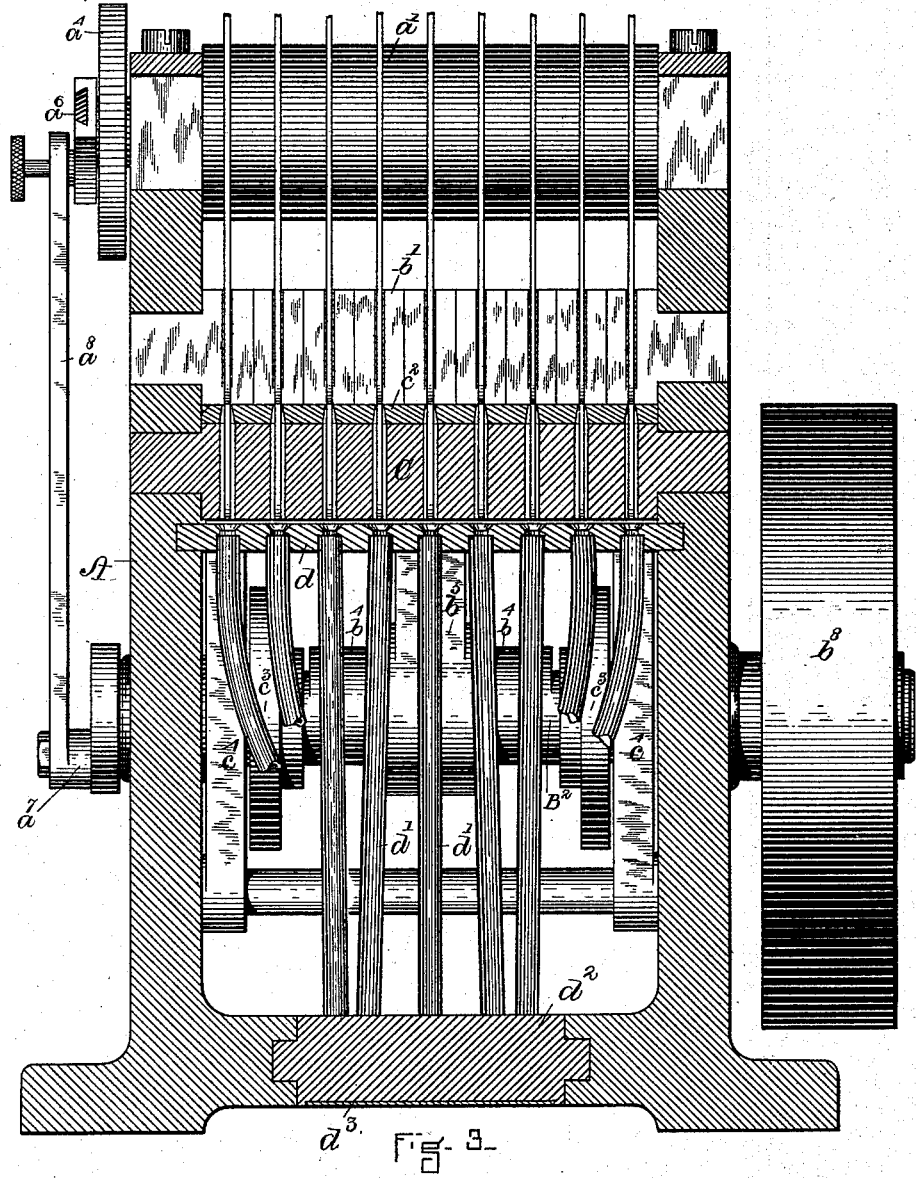
Figure 4:
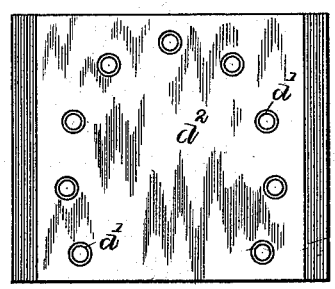
Figure 5:
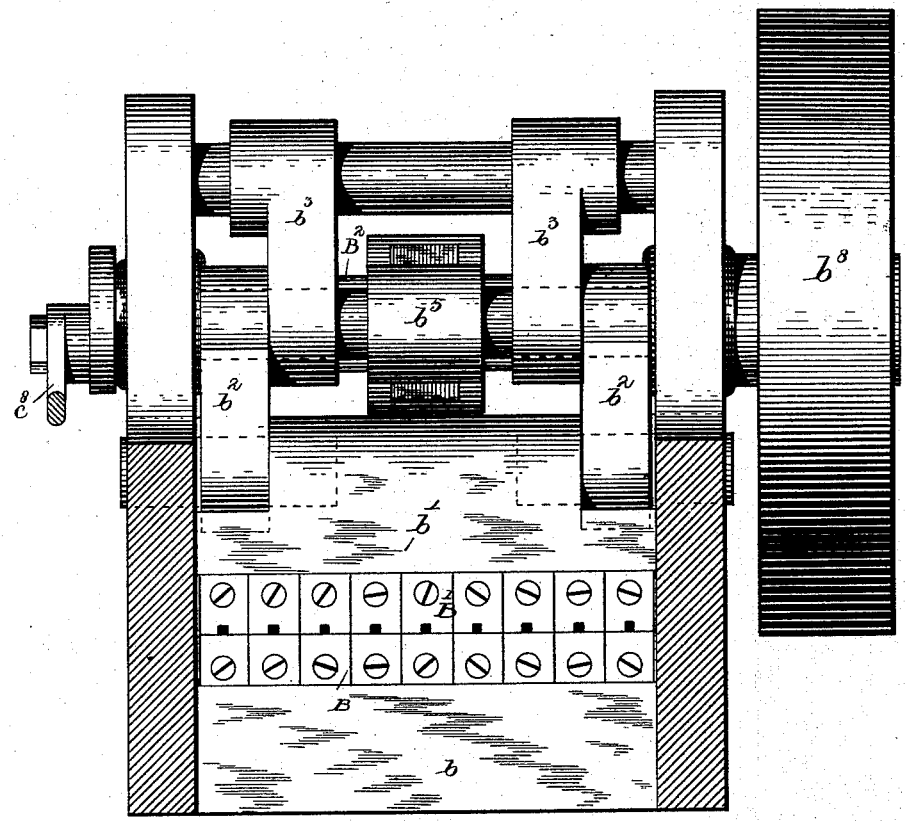
Figure 10:
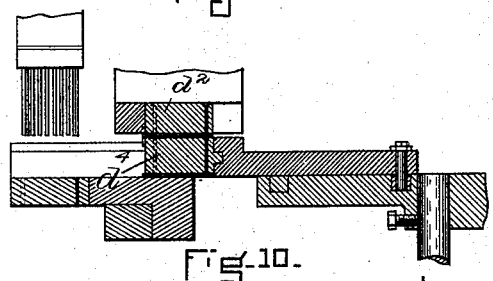

In the drawings, Figure 1 is a view in vertical central section of a machine having the features of my invention. Fig. 2 is a view in front elevation thereof. Fig. 3 is a view principally in vertical section from side to side of the machine. Fig. 4 is a view principally in plan of a portion of the nail-distributer. Fig. 5 is a view in section upon the dotted line $x$ $x$ of Fig. 3 in plan of parts below said line. Fig. 6 is a view in side elevation of the machine. Fig. 7 is a view illustrating a slightly-different way of operating the swaging-dies from that shown in Fig. 1, to which reference is hereinafter made. Figs. 8 and 9 are further views illustrating the form of construction shown in Figs. 7, and Fig. 10 is a detail view reduced in size.

The machine is represented as a multiple nail making and distributing machine—that is, a machine to simultaneously form a number of nails from as many different wires; but I would here remark that it may be used with one wire only, if desired.

A is the frame of the machine.

$a$ $a'$ are wire feed-rolls, the first of which is mounted upon the shaft $a^2$, and the second upon the shaft $a^3$, both of which shafts are carried or supported by the frame A. The shaft $a^3$ has a ratchet-wheel $a^4$, which is driven by a feed-pawl $a^5$, mounted on a lever $a^6$, which is pivoted to the shaft, (see Fig. 6,) and is operated by the crank $a^7$ and connecting-link $a^8$. The feed-rolls $a$ $a'$ are represented as long and as feeding nine wires.

B B' are the swaging-dies, and they may have any desired shape or configuration for pointing and otherwise forming the nail. I have represented the die B' as a box-die and the die B as a male die; and I have also shown a separate or independent pair of dies for each wire used—that is, as the machine is organized to feed nine wires there are represented nine sets of swaging-dies.

In Fig. 1 the swaging-die B is represented as stationary and supported by a block $b$, and the swaging-die B' as carried by the slide $b'$, which is represented as provided with a horizontal movement by means of the toggle $b^2$ $b^3$, the crank $b^4$ on the shaft $B^2$, and the pitman $b^5$. The dies are each provided with a horizontal extension $b^6$ at their upper ends, by means of which they are fastened to their respective block or slide by means of one or more fastening-screws $b^7$.

The shaft $B^2$ is the main shaft of the machine, and it carries the driving-pulley $b^8$ and a suitable balance or fly wheel. It also carries the crank $a^7$, operating the wire-feed rolls.

In Fig. 7 I have represented each of the sections B B' of the dies as movable, being supported upon blocks or supports which are caused to take a rotary movement on an arc of a circle toward and from each other, the support for the die B being secured to a shaft $b^9$, which carries a sector $b^{10}$. The support for the sections B' of the die is represented as secured to the shaft $b^{11}$, which carries a sector $b^{12}$, which engages the sector $b^{10}$, and this support is extended sufficiently to form the arm $b^{13}$, which is connected with the crank $b^4$ by means of the pitman $b^5$. (See Fig. 7.) On some accounts I prefer this construction, the members of the dies in this case moving upon an arc of a circle toward and from each other. Below the dies is a reciprocating block C, which also acts to sever the pointed ends of the wires at the completion of the formation of the points upon the next set of nails to be severed—that is, when the dies B B' are closed and in their lowest position, as represented in Figs. 1 and 7. This block C has a nail-receiving hole $c$ for each set of dies, and its upper part is formed by a hardened-steel plate $c^2$, the edge of which about the hole $c$ acts as the cut-off in connection with the lower edges of the dies B B'. This block C has a sharp, quick, reciprocating movement imparted to it while the dies are held closed or together by means of the cams $c^3$, levers $c^4$, the upper ends of which are connected with the block B by links $c^5$, and a cam-pin $c^6$ on each lever, which engages its respective cam-groove in said cams. (See Figs. 1, 2, and 6.) Each end of the block C is fitted to slide in ways or bearings formed in the frame A. The nails are delivered from the receiving cut-off block C to the distributer D, which comprises, essentially, a perforated plate $d$, supporting the upper ends of tubes $d'$, forming the conducting-passages of the distributer, and a block $d^2$, having holes with which the passages in the tubes connect. This block $d^2$ preferably has a hole-covering plate $d^3$, which is adapted to be automatically moved to uncover the holes by a nail-carrier $d^4$, the nail-carrier having holes corresponding in number and arrangement with the holes of the block $d^2$ and being adapted to receive nails automatically from the distributer and to transfer them to the nail-driving devices. The nail-carrier $d^4$, I prefer to operate by means of a cam. The slide-block $b'$ has its ends fitted to slide in ways formed in the frame A.

The operation of the device is as follows: The wires are fed by the feed-rolls to the swaging-dies, and the dies then simultaneously close upon the wires and form therein such points or pointed sections as may be required, and at the same time straighten the sections of the wires above the points. The completion of the operation of the dies brings their lower edges upon the same horizontal line, and the crank is at that instant upon its dead-center. The receiving and cut-off block C, into holes of which previously-pointed ends of the wire have been fed by the feed-rolls, makes a rapid movement and severs the pointed ends of the wires, the lower ends of the dies and the upper ends of the carrier C about the holes $c$ acting as shears in cutting off such sections of the wire as remain after the formation of the point or point-forming sections by the dies B B'. The nails then drop by gravity from the holes of the block C into the passages of the distributer, or are immediately forced therefrom by the wires, which are immediately fed by the feed-rolls upon the lifting or turning of the dies to their original or normal position, which separates them sufficiently to permit this feed movement of the wire to take place. The nails, dropping through the holes of the distributer, are delivered to the holes of the block $d^2$ and from thence to the carrier.

It will be seen that the shaft $B^2$ makes but one revolution for each gang of nails delivered, and that in the machine illustrated nine nails are made and delivered at one rotation of the shaft. If a single wire is used instead of a gang, to provide for the distribution of a number of nails it will be necessary to use in connection with the nail-receiving block, and between it and the distributer, a transferring-block similar to those described in various of my patents. The machine can of course be used for making nails simply, in which case the distributer would not be employed.

Having thus fully described my invention, I claim and desire to secure by Letters Patent of the United States—

1. The combination, in a nail making and distributing machine, of the swaging-dies B B', a wire-feeding mechanism for feeding wire thereto, the cut-off block C, having one or more nail-receiving holes $c$, arranged to operate in relation to the dies B B' as specified, all substantially as described.

2. The combination of the swaging-dies B B', wire-feeding mechanism, the nail-receiving and cut-off block C, and the nail-distributer D, substantially as described.

3. The combination of the swaging-dies B B', the wire-feeding mechanism, the nail-receiving and cut-off block C, the nail-distributer D, and the nail-carrier $d^4$, substantially as described.

4. The combination of a gang or group of sections B of swaging-dies, the gang or group of sections B' of swaging-dies, mechanism for simultaneously operating the same, a wire-feeding mechanism for feeding a group of wires, one to each pair of swaging-dies, a nail-receiving and cut-off block C, having the holes $c$, and mechanism for imparting to it horizontal movement relatively to the dies and while they are in their lowest position, substantially as described.

5. The combination of a gang of swaging-dies B B' and mechanism for simultaneously operating the same, wire-feeding mechanism for simultaneously feeding a gang of wires to the swaging-dies, the nail-receiving and cut-off block C, having holes $c$, and the distributer D, substantially as described.

6. The combination of a gang of sections B of swaging-dies mounted upon a common support $b$, the gang of sections B' of swaging-dies mounted upon the support $b^7$, and a crank $b^4$ and connecting mechanism for operating said dies simultaneously, substantially as described.

7. The combination of the sections B of swaging-dies and their support $b$, the sections B' of swaging-dies and their supports $b'$, the shaft $B^2$, the crank $b^4$ and operating mechanism to operate said swaging-dies, a cam $c^3$ upon the said shaft $B^2$, the nail-receiving and cut-off block C, and mechanism connecting the cam with the block, whereby upon the end of the swaging movement of the dies the cut-off block is caused to be operated to sever the gang of nails while the wires are held by the swaging-dies, substantially as described.

8. The combination, in a nail-making machine, of two series or groups of swaging-dies B B', adapted for simultaneous operation upon a group or gang of nail blanks or wires, substantially as described.

9. The combination of the gangs or groups of swaging-dies B B', adapted for conjoint operation upon a series of nail rods, bars, or wires, with an intermittent rod, bar, or wire feeding mechanism for simultaneously feeding a series of nail-forming rods, wires, or bars to the swaging-dies, substantially as described.

10. The combination of the swaging-dies B B' with the distributer D, substantially as described.

11. The combination of the swaging-dies B B', the distributer D, and nail-carrier $d^4$, substantially as described.

12. The combination of the swaging-dies B B' and the cut-off block C, substantially as described.

13. The combination of the swaging-dies B B', cut-off C, and distributer D, substantially as described.

FREEBORN F. RAYMOND, 2D.

Witnesses:
J. M. DOLAN,
A. F. MACDONALD.